United States Patent [19]

Arai et al.

[11] Patent Number: 4,974,787
[45] Date of Patent: Dec. 4, 1990

[54] FILM GUIDE DEVICE

[75] Inventors: Akihiro Arai, Saitama; Masao Sato, Fujimi, both of Japan

[73] Assignee: Asahi Kogaku Kogyo Kabushiki Kaisha, Tokyo, Japan

[21] Appl. No.: 451,312

[22] Filed: Dec. 15, 1989

[30] Foreign Application Priority Data

Apr. 5, 1985 [JP] Japan ................................. 60-72281

[51] Int. Cl.⁵ ..................... B65H 75/28; G03B 1/00
[52] U.S. Cl. ..................................... 242/71; 242/74; 354/212
[58] Field of Search .................. 242/71–71.7, 242/74; 354/173.1, 173.11, 212

[56] References Cited

U.S. PATENT DOCUMENTS

| | | | |
|---|---|---|---|
| 3,567,147 | 3/1971 | Engelsmann et al. | 242/71.1 |
| 3,979,079 | 9/1976 | Ohashi et al. | 242/75.2 |
| 4,274,726 | 6/1981 | Yoneyama et al. | 242/71.1 |
| 4,310,233 | 1/1982 | Okuyama et al. | 354/212 |
| 4,451,011 | 5/1984 | Engelsmann et al. | 242/71 |
| 4,477,162 | 10/1984 | Matsumoto | 354/212 |

Primary Examiner—John M. Jillions
Attorney, Agent, or Firm—Sandler, Greenblum & Bernstein

[57] ABSTRACT

Disclosed is a film guide device of a camera for introducing the end of a film fed by a sprocket between a take-up spool and a guide member which is in resilient contact with the take-up spool. The guide member is composed of a roller located in the area corresponding to the cutaway portion at the end of a film, and a guide portion located in the area corresponding to the tongue portion of the film and opposed to the take-up spool.

The positions of the roller and guide portion are set so that, when the roller is in contact with the take-up spool, the guide portion is apart from the take-up spool by a distance greater than the thickness of the film.

15 Claims, 2 Drawing Sheets

FILM GUIDE DEVICE

This is a continuation of application Ser. No. 829,763 filed on Feb. 14, 1986, now abandoned.

BACKGROUND OF THE INVENTION

The present invention relates to a film guide device of a camera for automatically loading a film (35 mm, J135).

This kind of film guide device is generally composed of a take-up spool and a guide plate having a roller at its end which is in resilient contact with the take-up spool. The end of a film which is fed by a sprocket is prevented from coming into loose contact with the take-up spool or deviating from its correct path by the guide plate and the roller, and is wound around the take-up spool.

Although the roller at the end of the guide plate is provided for the purpose of preventing the film from being damaged, space limits the size of the roller so that only small-diameter ones may be employed. A certain space is also required between the guide plate and the roller to allow rotation of the roller As a result, a film is sometimes caught in the space between the roller and the guide plate, leading to slackening of the film or improper loading.

SUMMARY OF THE INVENTION

Accordingly, it is an object of the present invention to provide a film guide device which eliminates any danger of a film being caught.

To achieve this aim, the present invention has been accomplished on the basis of the idea that a tongue portion at the end of a film may be utilized such as to prevent the film from being caught A film guide device according to the present invention comprises a guide member which is composed of a roller located in the area corresponding to the cutaway portion at the end of a film and a guide member located outside the area, namely, in the area corresponding to the tongue portion of the film and opposed to a take-up spool. This structure does not allow the film to come into contact with the roller at the beginning of winding the film, and thereby precludes the possibility of the film being caught in the space between the roller and the guide plate.

The above and other objects, features and advantages of the present invention will become clear from the following description of the preferred embodiment thereof, taken in conjunction with the accompanying drawings.

BRIEF DESCRIPTION OF THE DRAWINGS

The drawings illustrate in combination an embodiment of a film guide device according to the present invention, wherein.

DESCRIPTION OF THE PREFERRED EMBODIMENT

Figure 1:
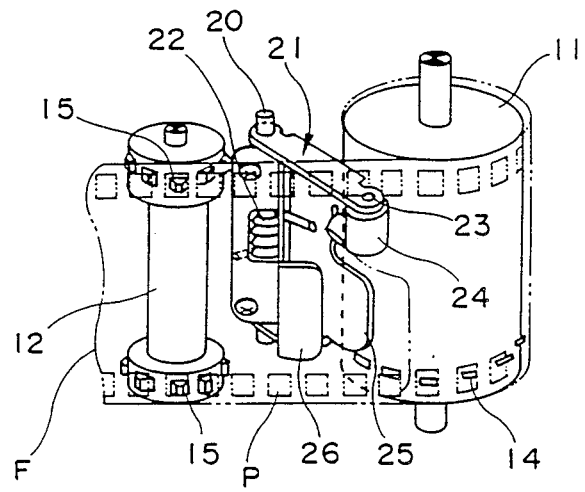
FIG. 1 is a perspective view of the main part thereof.
Figure 2:
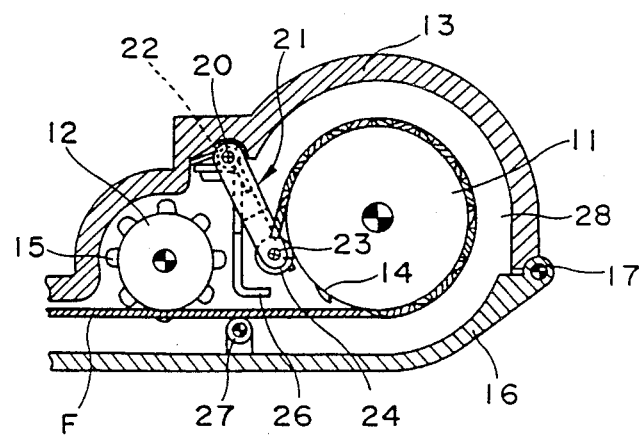
FIG. 2 is a cross sectional view.

An embodiment of the present invention will be described with reference to the accompanying drawings hereinunder.

A take-up spool 11 and a sprocket 12 are respectively rotatably supported by a camera body 13. The take-up spool 11 has teeth 14 on its peripheral surface at the lower end thereof which are engaged with the perforations P of a film F, and the sprocket 12 has teeth 15 on the peripheral surface at the upper and the lower ends thereof which are engaged with the perforations P of the film F. The sprocket 12 is rotated by one exposure each time the film is wound on per winding by means of a known mechanism. The take-up spool 11 is rotated through a clutch (slip) mechanism. The reference numeral 16 denotes a back-cover attached to the camera body 13 in such a manner as to be pivotably supported by a shaft 17.

A guide member 21 is attached to the camera body 13 between the take-up spool 11 and the sprocket 12 at a portion which is remote therefrom in such a manner that the guide member 21 is pivotally supported by a shaft 20. A spring 22 wound around the shaft 20 urges the guide member 21 in the direction in which the end of the guide member comes into contact with the take-up spool 11.

Figure 3:
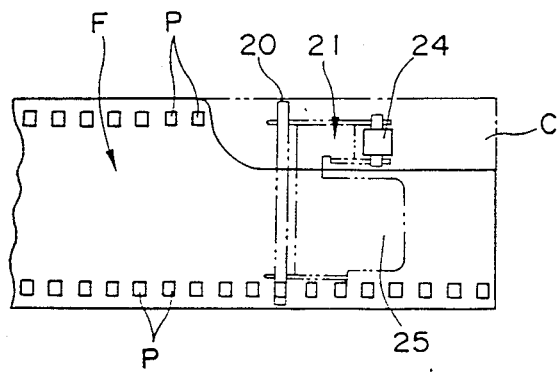
FIG. 3 is an elevational view of a film and a guide member, showing the positional relationship between the cutaway portion and the roller of the guide member.

A roller 24 is provided at the upper end of the guide member 21 such as to be rotatably supported by a shaft 23. The roller 24 is, as is clear from FIG. 3, located in the area corresponding to the cutaway portion C at the end of the film F. On the other hand, the lower portion of the guide member 21 is situated outside the area of the cutaway portion C, namely, in the area corresponding to the tongue portion, and constitutes a guide portion 25 which faces the take-up spool 12.

Figure 4:
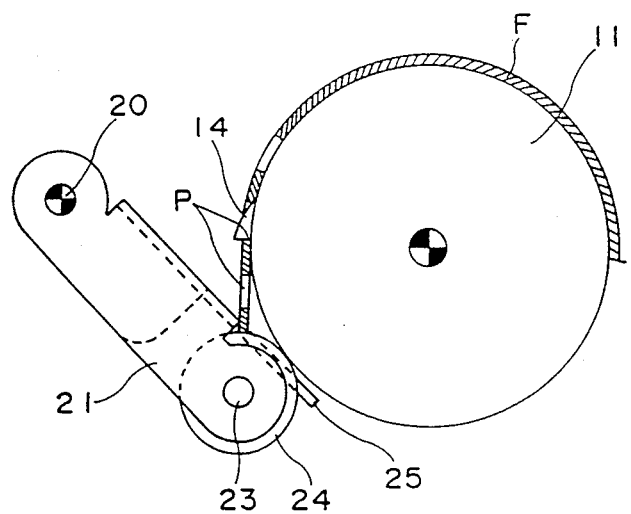
FIG. 4 is an enlarged view of the main part, showing the state in which the film is in loose contact with a take-up spool.

The positions of the roller 24 and the guide portion 25 are so determined that, when the roller 24 is in contact with the take-up spool 11, as shown in FIG. 4, the guide portion 25 is kept apart from the take-up spool 11 by a distance greater than the thickness of the film F. The reference numeral 26 denotes a protector plate which covers the guide member 21 so as to protect it from being touched extraneously. A guide roller 27 which is rotatably provided on the inner surface of the back-cover 16 comes into contact with the reverse of the film F when the back-cover 16 is closed.

The operation of this embodiment having the above-described structure will now be explained. The end portion of the film F is inserted into a winding chamber 28 from between the take-up spool 11 and the camera body 13 such that the perforations P are engaged with the teeth 15 of the sprocket 12. The back-cover 16 is closed in this state and the sprocket 12 is rotated. The perforations P are then engaged with the teeth 14 of the take-up spool 11 and the film F is thus wound around the take-up spool 11. In this case, if the tooth 14 is engaged with the first perforation P at the tip of the film, the film comes into close contact with the take-up spool and the distance between the end of the film F and the peripheral surface of the take-up spool 11 is short, so that no winding trouble occurs. On the other hand, if the tooth 14 is engaged with a perforation P other than the first perforation, the film F comes into loose contact with the take-up spool 11 and the distance between the end of the film F and the peripheral surface of the take-up spool 11 inconveniently becomes long, as is shown in FIG. 4. Supposing the roller 24 is provided such as to extend over the entire length of the end of the guide member 21, the end of the film F would sometimes then be caught in the space between the roller 24 and the guide member 21, so that smooth winding is impeded.

According to the present invention, however, the roller 24 is provided not over the entire length of the guide member 21 but merely in the area corresponding to the cutaway portion C at the end of the film F. Therefore, the roller 24 comes into contact with the take-up spool 11, but does not come into contact with the film F. The end of the film F is in contact with the guide portion 25. Accordingly, even if the end of the film F comes into loose contact with the take-up spool 11 as shown in FIG. 4, the film F is correctly introduced by the guide member 25 and wound around the take-up spool 11. Since the guide portion 25 is so designed as to be situated apart from the take-up spool 11 by a distance greater than the thickness of the film F when the roller 24 is in contact with the take-up spool 11, the film travels smoothly into the space between the take-up spool 11 and the guide portion 25. When the film F is further wound and begins to be wound around the take-up spool at the second turn, the end of the film F which is in loose contact with the take-up spool 11 at the first turn is pressed against the take-up spool 11.

During this time, the roller 24 comes into contact with the film F and the guide member 21 rocks around the shaft 20 by an amount corresponding to the thickness of the film F. The guide portion 25 thereby comes out of contact or into loose contact with the film F, so that there is no danger of the exposed film being damaged.

Additionally, if an appropriate material is selected for making the guide member 25 and it is subjected to an appropriate surface treatment or the like, it is also possible to design this guide member so that, when the roller 24 is in contact with the take-up spool 11, the guide member 25 also comes into contact with the film F, and at the same time to prevent the film F from being damaged.

As described above, the film guide device according to the present invention utilizes the tongue portion at the end of a film and prevents the end of a film from being caught by the roller portion. Since the end of the film is correctly introduced to the outer surface of the sprocket by the guide portion, there is no possibility of misloading. If this device is designed so that, when the roller is in contact with the take-up spool, the guide portion is substantially out of contact with the take-up spool, the film comes into contact with the rotating roller alone without coming into close contact with the guide portion, so that there is no danger of the exposed film being damaged.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A film guide device of a camera for guiding film having a leading tongue portion and a remaining portion and adapted to be fed to be wound up on a take-up spool having a circumferential surface, said film guide device comprising a guide member arranged to be in resilient contact with said take-up spool, said guide member comprising:

a guide plate portion oppositely positioned with respect to a first circumferential surface area of said take-up spool, the leading tongue portion of the film passing said first area when it is wound up; and
   a guide roller portion oppositely positioned with respect to a second circumferential surface area of said take-up spool, wherein said film remaining portion passes both said first and second areas when it is would up on said take-up spool;
   said guide plate portion being spaced apart from said circumferential surface of said take-up spool by a distance greater than the thickness of said film when said guide roller portion contacts said circumferential surface;
   said guide roller portion being arranged to contact the film after the leading tongue portion is nipped between said circumferential surface of said take-up spool and at least part of said remaining portion of the film, such that by the time that said remaining portion of the film is nipped between said guide roller portion and said circumferential surface of said take-up spool, the leading tongue portion of the film will be tightly wound on said take-up spool.

2. A film guide device according to claim 1, further including means for biasing said guide plate portion and said guide roller portion towards said take-up spool.

3. A film guide device according to claim 1, further comprising means for positioning said guide plate portion and said guide roller portion opposite substantially axially aligned areas of said take-up spool.

4. A film guide device for a camera according to claim 1, wherein the positions of said roller and guide portion are set so that, when said roller is in contact with said take-up spool, said guide portion is apart from said take-up spool by a distance greater than the thickness of said film.

5. In a film guide device of a camera for introducing the end of a film fed by a sprocket between a take-up spool and a guide member which is adapted to be positioned in resilient contact with said take-up spool, said film comprising a leader tongue portion defined by a cut away film portion and a remaining film portion, said take-up spool including a circumferentially extending film supporting surface, said guide member comprising:

a roller positioned opposite an area of said take-up spool corresponding to the cut-away film portion and adapted to contact said remaining film portion on said film supporting surface of said take-up spool; and
   a guide portion positioned opposite an area of said take-up spool corresponding to the leader tongue portion of the film, spaced from the cut-away film portion and spaced from the circumferential film supporting surface of the take-up spool.

6. A film guide device for a camera according to claim 5, further comprising means for positioning said roller and guide portion so that when said roller is in contact with said film supporting surface of the take-up spool, said guide portion is spaced apart from said take-up spool by a distance greater than the thickness of the film.

7. A film guide device for a camera according to claim 6, further including means for biasing said roller and said guide portion towards said film supporting surface of said take-up spool.

8. A film guide device of a camera according to claim 5, further comprising means for spacing said guide portion from said circumferential film supporting surface of said take-up spool by a distance greater than the thickness of the film when said roller is in direct contact with said circumferential film supporting surface of said take-up spool.

9. A film guide device according to claim 5, further comprising means for positioning said roller to contact the remaining film portion after the leading tongue portion of the film is nipped between said circumferential film supporting surface of said take-up spool and the remaining film portion.

10. A film guide device of a camera according to claim 5, further including means for supporting said roller and said guide portion, said supporting means comprising a single support structure.

11. A film guide device according to claim 5, further comprising means for positioning said roller and said guide portion opposite substantially axially aligned areas of said take-up spool.

12. In a film guide device of a camera for introducing the end of a film fed by a sprocket between a take-up spool and a guide member which is adapted to be in resilient contact with said take-up spool, the end of the film comprising a tongue portion defined by a cutaway film portion and a remaining film portion, said take-up spool including a circumferentially extending film supporting surface, said guide member comprising:

first guide means for guiding the film tongue portion and spaced from the film supporting surface of said take-up spool;

second guide means for guiding the film and located adjacent the cutaway film portion, said second guide means adapted to contact said film supporting surface of said take-up spool;

said second guide means comprising a guide roller adapted to contact said remaining film portion after the leading tongue portion is nipped between said circumferential film supporting surface of said take-up spool and the remaining film portion; and wherein said first guide means is spaced from said film supporting surface of said take-up spool by a distance greater than the thickness of the film.

13. The film guide device according to claim 12, further comprising means for biasing said first and second guide means towards said film supporting surface of said take-up spool.

14. The film guide device of a camera according to claim 12, further comprising means for supporting both said first and second guide means, said supporting means comprising a single supporting structure.

15. The film guide device of a camera according to claim 12, further comprising means for positioning said first and second guide means opposite substantially axially aligned areas of said take-up spool.

* * * * *

UNITED STATES PATENT AND TRADEMARK OFFICE
CERTIFICATE OF CORRECTION

PATENT NO. : 4,974,787

DATED : December 4, 1990

INVENTOR(S) : Akihiro ARAI et al.

It is certified that error appears in the above-identified patent and that said Letters Patent is hereby corrected as shown below:

```
    At column 4, line 9 (claim 1, line 16), change "would" to
---wound---.
```

Signed and Sealed this

Twenty-first Day of September, 1993

Attest:

BRUCE LEHMAN

Attesting Officer      Commissioner of Patents and Trademarks